US006766866B2

(12) United States Patent
Miyahara et al.

(10) Patent No.: US 6,766,866 B2
(45) Date of Patent: Jul. 27, 2004

(54) TILLER

(75) Inventors: Kazuyoshi Miyahara, Wako (JP); Masayuki Sasaoka, Wako (JP); Nobuchika Katagiri, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/360,116

(22) Filed: Feb. 7, 2003

(65) Prior Publication Data

US 2003/0159838 A1 Aug. 28, 2003

(30) Foreign Application Priority Data

Feb. 22, 2002 (JP) ........................................ 2002-046222

(51) Int. Cl.[7] .......................... A01B 33/10; B62D 51/06
(52) U.S. Cl. .......................... 172/41; 172/42; 172/508; 172/123; 172/125; 171/137
(58) Field of Search .............................. 172/35, 41, 42, 172/81, 508–517, 118, 123, 125; 171/137

(56) References Cited

FOREIGN PATENT DOCUMENTS

| JP | 5889431 | 6/1983 |
|---|---|---|
| JP | 59153669 | 9/1984 |

*Primary Examiner*—Christopher J. Novosad
(74) *Attorney, Agent, or Firm*—Adams & Wilks

(57) ABSTRACT

A tiller includes an engine, a transmission mechanism, and a rotor shaft having tillage tines mounted thereon. The transmission mechanism transmits a motive power of the engine to the rotor shaft to thereby cause the tillage tines to perform a tilling operation. The tiller also includes a tranmission case having the transmission mechanism housed therein, and a fender disposed to cover the tillage tines. The fender is mounted to the tranmission case by bolts. Each bolt has a portion projecting downwardly from the fender. The tiller further includes a guard member extending downwardly from the transmission case to a level lower than the downwardly projecting portion of each bolt. The guard member guards the bolts against a foreign object thrown upwardly by the tillage tines during the tilling operation.

19 Claims, 8 Drawing Sheets

TILLER

FIELD OF THE INVENTION

The present invention relates to an improvement in a tiller including tillage tines and a fender disposed above the tillage tines to cover the same, and in particular to an improvement in a portion of the fender to be attached to an engine of the tiller.

BACKGROUND OF THE INVENTION

Known tillers include rotor shafts having tillage tines provided thereon. Tillage operation is performed by rotation of the tillage tines. The rotation of the tines propels the tillers. The thus arranged tillers are popular because they are easy to operate and can make small sharp turns. Such tillers are often "front tine tiller" and known from, for example, Japanese Utility Model Laid-Open Publication No. SHO 58-89431 entitled "STRUCTURE FOR PROTECTING CLUTCH LEVER OF TILLER" and Japanese Patent Laid-Open Publication No. SHO 59-153669 entitled "ELECTRIC TILLER".

A tiller disclosed in the publication No. SHO 58-89431 includes an engine, a transmission case, a rotor shaft supported by the transmission case, and tillage rotors mounted on the rotor shaft. The case has a transmission mechanism disposed therein. Motive power of the engine is transmitted through the transmission mechanism to the rotor shaft. This causes the tillage rotors mounted on the rotor shaft to perform a tillage operation. The case has a fender mounted via bolts to an upper part thereof. The fender covers the rotors. Each bolt has a portion protruding downwardly from the fender.

Disclosed in the publication No. SHO 59-153669 is a tiller including an electric motor, and a rotor shaft case accommodating therein a transmission mechanism. Motive power of the electric motor is transmitted via the transmission mechanism to a rotor shaft supported by the rotor shaft case. The transmission of the motive power causes tillage tines mounted on the rotor shaft to perform a tillage operation. The rotor shaft case has a fender mounted to an upper part thereof by means of bolts. This arrangement allows the fender to cover the tillage tines. Each bolt has a portion projecting downwardly from the fender.

For the tiller of the publication No. SHO 58-89431, the tillage rotors under the tillage operation upwardly throw foreign objects such as small stones. Most of the objects strike the fender and thus fail to be thrown further upwardly. Some of the objects are directed to the bolts. These bolts are detached from or attached to the fender and the transmission case when the tiller undergoes maintenance operation. For easy and proper maintenance operation, it is important to provide sufficient durability of the bolts. For the disclosed tiller, however, foreign objects are highly likely to hit the bolts or to be caught or lodged between the bolts and the tillage rotors. Under such a condition, the bolts are made durable with difficulty.

To address this problem, one may propose to provide bolts having improved durability inherent therein. However, such inherently-highly-durable bolts are undesirably expensive. One may further propose to provide an additional cover for covering these bolts completely. Provision of the cover increases the number of components of the tiller. In addition, the tiller including such a cover is complicated in construction. It is thus troublesome to subject the tiller of complicated construction to maintenance operation. The tiller as disclosed in the publication No. SHO 59-153669 also suffers from the same problem as the tiller of the publication No. SHO 58-89431.

SUMMARY OF THE INVENTION

An object of the present invention is to provide a tiller having cheap or inexpensive bolts for attaching a fender to the tiller which are durable enough to ensure that maintenance operation is properly carried out on the tiller.

According to one aspect of the present invention, there is provided a tiller comprising: an engine for producing a motive power; a transmission case mounted to the engine, the transmission case having a transmission mechanism housed therein; a rotor shaft coupled to the transmission mechanism; tillage tines mounted on the rotor shaft, the transmission mechanism transmitting the motive power to the rotor shaft to cause the tillage tines to perform a tilling operation; a fender disposed above the tillage tines to cover the tillage tines; bolts mounting the fender to the transmission case therethrough, the bolts each having a portion projecting downwardly from the fender; and a guard member extending downwardly from at least one of the transmission case and the fender to a level lower than the downwardly projecting portion of each of the bolts, the guard member guarding the bolts against a foreign object thrown upwardly by the tillage tines under the tilling operation.

The guard member extends downwardly from at least one of the transmission case and the fender to a level lower than a portion of each bolt projecting downwardly from the fender. Provision of such a guard member makes it possible to guard the bolts against a foreign object which, after thrown up by the tillage tines, would be otherwise directed to the bolts. Foreign matters thrown up by the tillage tines under the tilling operation can be prevented from hitting the bolts or getting caught between the bolts and the tillage tines.

Accordingly, providing the guard member alone ensures that the bolts can be kept durable even if they are cheap ones. That is, it becomes possible to provide sufficient durability of the bolts without requiring additional components. The thus arranged tiller can properly undergo the maintenance operation.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENT

Figure 1:
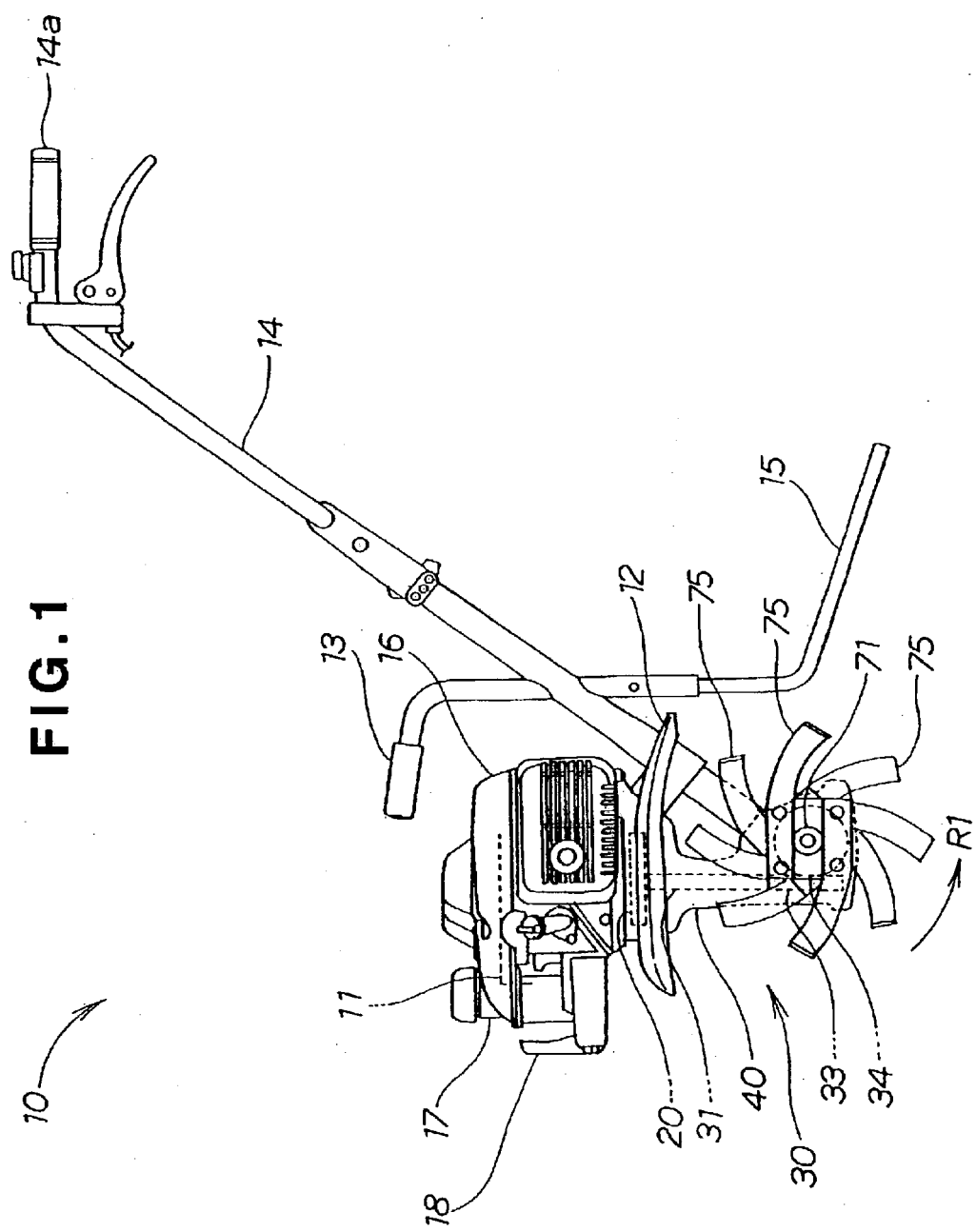
FIG. 1 is a left side view of a tiller according to the present invention.

Referring to FIG. 1, a walk-behind self-propelled tiller 10 includes an engine 11 serving as a source of power, a clutch 20, a transmission mechanism 30, and a rotor shaft 71. A motive power produced by the engine 11 is transmitted through the clutch 20 and the transmission mechanism 30 to the rotor shaft 71. The rotor shaft 71 has plural tillage tines 75 mounted thereon. Transmission of the motive power of the engine 11 to the rotor shaft 71 causes the tillage tines 75 to perform tilling operation. The tillage tines 75 propel the tiller 10, performing the tilling operation. The tiller 10 includes a fender 12 disposed above the tines 75. The fender 12 covers the tines 75. It is noted that the fender 12 serves to prevent earth and sand having undergone the tilling operation from scattering. The tiller 10 further includes a transmission case 40 having the fender 12 attached thereto. The tiller 10 is often called "tiller of front tine type".

The engine 11 is a prime mover having an output shaft or a crankshaft 11a (see FIG. 3) oriented substantially vertically. The output shaft 11a rotates only in one direction. In other words, the rotor shaft 71 rotates in such a direction R1 that the tines 75 rotate counterclockwise on the shaft 71. Specifically, the rotor shaft 71 rotates in the direction R1 such that, when tilling the ground, each tillage tine 75 is turned on the shaft 71 from an upward directed position to a forward directed position and then to a downward directed position. It should be noted that, when in the forward directed position, the tine 75 is directed in a direction of propulsion of the tiller 10. Similarly, the tine 75 in the downward directed position is directed towards the ground.

The tiller 10 includes a carrier handle 13. The tiller 10 is so small in size that it can be carried with the handle 13 gripped by a single hand. The tiller 10 includes an operational rod 14 extending upwardly and rearwardly from a rear part of the transmission case 40. The rod 14 has a skid 15 extending downwardly from a lower part thereof. The skid 15 is to pierce the ground to a depth at which the tillage tines 75 perform the tilling operation. In addition, the skid 15 provides a resistance to the force produced by the tillage tines to propel the tiller 10.

Reference numerals 14a, 16, 17, 18 represent a grip, an engine cover, a fuel tank, and a tiller body guard member (a protector for protecting a tiller body), respectively.

Figure 2:
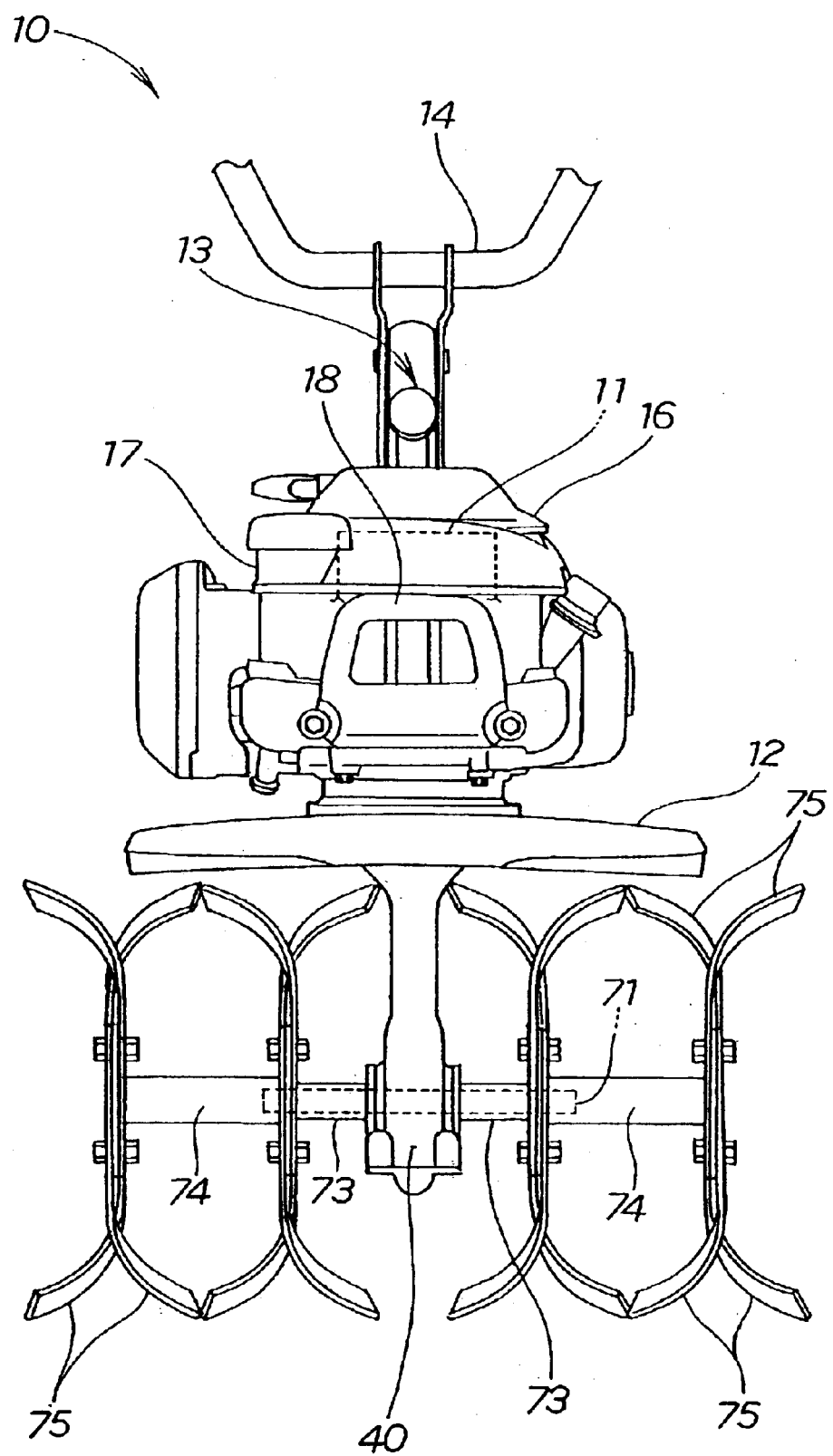
FIG. 2 is a front elevation view of the tiller.

As shown in FIG. 2, the transmission case 40 has the shaft 71 horizontally extending therefrom in a widthwise direction of the tiller body. The shaft 71 has right hollow shafts 73, 74 and left hollow shafts 73, 74 extending from right and left ends thereof, respectively. The plurality of the tillage tines 75 are mounted on these hollow shafts 73, 73, 74, 74. The fender 12 is larger in width than the engine 11. The width of the fender 12 is smaller than a distance between the leftmost tillage tine 75 and the rightmost tillage tine 75.

Figure 3:
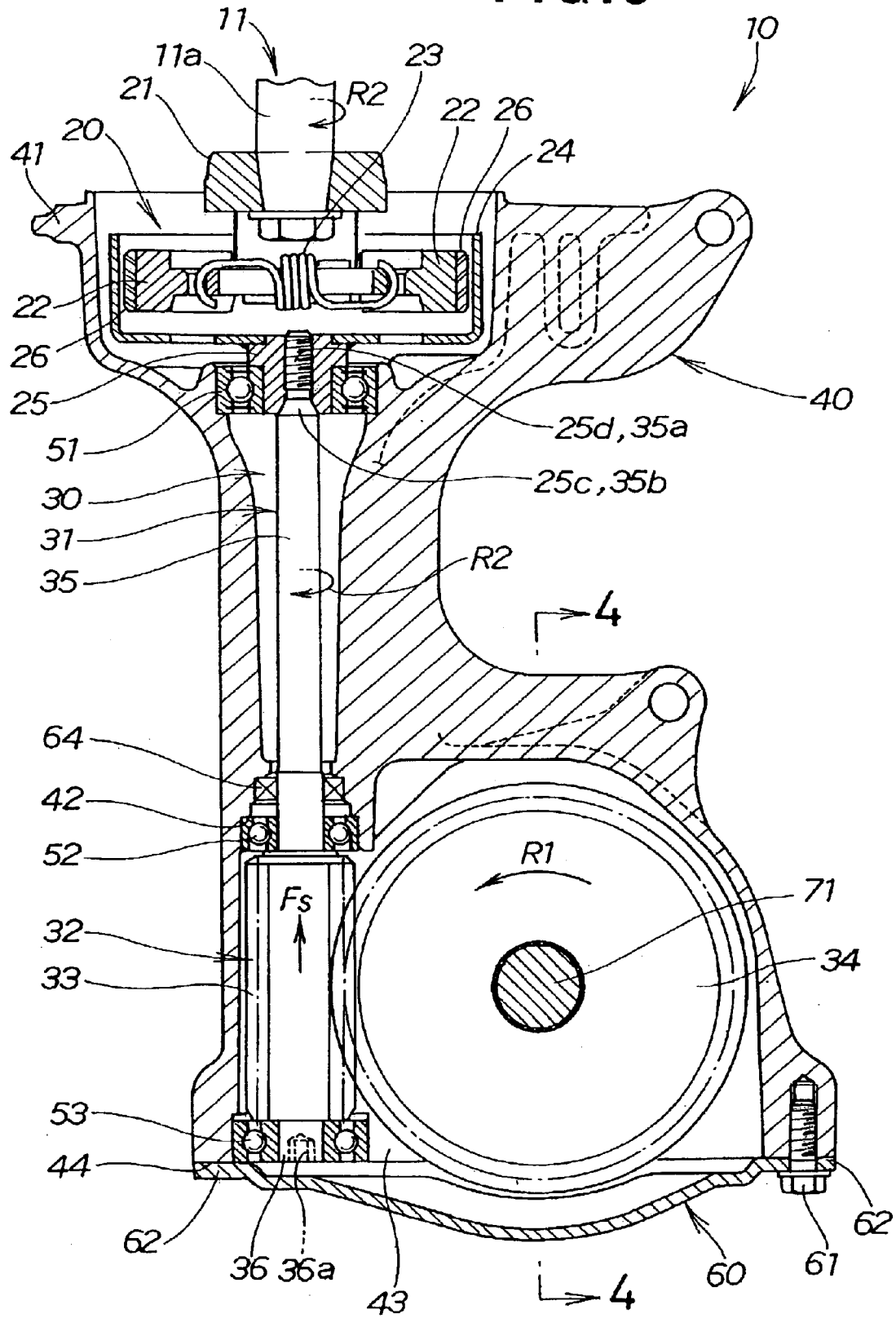
FIG. 3 is an enlarged, vertical cross-sectional view of a transmission case of the tiller of FIG. 1.

Turning to FIG. 3, the transmission case 40 has an upper flange 41 formed integrally therewith. The upper flange 41 is bolted to a lower part of the engine 11 positioned above the transmission case 40. The transmission case 40 has the clutch 20, the transmission mechanism 30, and the rotor shaft 71 all of which are housed therein.

The transmission mechanism 30 is connected through the clutch 20 to the downwardly extending output shaft (the crankshaft) 11a of the engine 11. The mechanism 30 has a transmission shaft 31 positioned in coaxial relation to the output shaft 11a. The shaft 31 extends substantially vertically. The mechanism 30 further includes a worm gear mechanism 32 for transmitting the motive power from the shaft 31 to the horizontally extending rotor shaft 71.

The worm gear mechanism 32 includes a worm 33 serving as a driving gear. The worm 33 is formed integrally with the transmission shaft 31. The worm gear mechanism 32 further includes a worm wheel 34 (hereinafter referred to as "wheel 34") serving as a driven gear. The wheel 34 is coupled to the rotor shaft 71 with their splines engaging each other.

The wheel 34 attached to the rotor shaft 71 engages the worm 33. The transmission shaft 31 has a first shaft portion 35 extending upwardly from one end of the worm 33. The shaft portion 35 is connected via the clutch 20 to the engine 11. All of the worm 33, the wheel 34, and the shaft portion 35 are accommodated within the transmission case 40. The shaft 31 has a second shaft portion 36 extending downwardly from one end (which is positioned opposite from the first shaft portion 35) of the worm 33. The first and second shaft portions 35, 36 are smaller in diameter than the worm 33.

Discussion will be made as to the clutch 20. The clutch 20 is a centrifugal clutch designed to produce a centrifugal force to transmit rotation of the output shaft 11a to the transmission shaft 31 when an engine speed of the engine 11 increases to above a predetermined value. The centrifugal clutch 20 includes a driving member 21 attached to a lower end of the output shaft 11a of the engine 11, a pair of right and left centrifugal members 22, 22 radially movably mounted to the driving member 21, a spring 23 for urging the members 22, 22 in a radially inward direction of the clutch 20, and an outer cup 24 (a driven member) accommodating therein the centrifugal members 22, 22. The outer cup 24 is mounted to an upper end of the first shaft portion 35.

The outer cup 24 has a hub 25 provided centrally thereof. The hub 25 is rotationally mounted within the transmission case 40 by means of a first bearing 51.

The hub 25 has the upper end of first shaft portion 35 threadedly connected thereto. When threadedly connected to the hub 25, the upper end of the shaft portion 35 is turned in the same direction R2 as the output shaft 11a. This arrangement eliminates concern that the connection between the hub 25 and the upper end of the shaft portion 35 is made less tight during the operation of the engine 11.

Reference numerals 25c, 25d, 35a, 35b denote a female taper portion, an internal thread, an external thread, and a male taper portion, respectively.

The second shaft portion 36 has an adjustment portion 36a for adjusting an amount by which the upper end of the first shaft portion 35 is screwed into the hub 25 for connection thereto. Specifically, the adjustment portion 36a is formed in an end surface of the shaft portion 36. The adjustment portion is a hole for a bar wrench.

When the engine speed increases to above the predetermined value, the centrifugal members 22, 22 are subjected to increased centrifugal force. This centrifugal force causes the members 22, 22 to move radially and outwardly against a force exerted by the spring 23 on the members 22, 22. Consequently, friction plates 26, 26 are pressed against an inner peripheral surface of the outer cup 24 to thereby transmit the motive power of the engine 11 to the transmission mechanism 30.

The transmission case 40 includes the first bearing 51, a second bearing 52, and a third bearing (a lower bearing) 53.

The first bearing 51 is provided for preventing the clutch 20 from moving towards the worm 33. The second bearing 52 is provided for preventing the worm 33 from moving towards the clutch 20. The third bearing 53 supports the second shaft portion 36.

The rotor shaft 71 and the wheel 34 rotate in the direction (the counterclockwise direction) R1. The output shaft 11a, the clutch 20, the transmission shaft 31, and the worm 33 for rotating the wheel 34 are rotated in the direction (the clockwise direction) R2. It will be understood that the output shaft 11a rotates in such a direction R2 as to threadedly connect the first shaft portion 35 of the transmission shaft 31 to the clutch 20.

Since the wheel 34 rotates in the direction R1, a thrusting reaction force Fs directed towards the clutch 20 is produced and exerted by the wheel 34 on the worm 33 and then on the transmission shaft 31. The transmission shaft 31 rotates only in such a direction R2 as to undergo the force Fs directed towards the clutch 20.

The first bearing 51 is subjected only to a radial load from the outer cup 24 without undergoing the force Fs. The first bearing 51 is a rolling bearing such as a deep groove ball bearing.

The second bearing 52 is subjected to both a radial load from the transmission shaft 31 and the force Fs. The second bearing 52 is a rolling bearing such as an angular contact ball bearing. The second bearing 52 includes an inner ring having its lower end surface abutting on a top surface of the worm 33, and an outer ring having its upper end surface abutting on a stepped portion 42 of the transmission case 40. This arrangement makes it possible to prevent the transmission shaft 31 and the worm 33 from moving towards the clutch 20. In addition, it becomes possible for the first shaft portion 35 to be rotatably supported by the second bearing 52.

The third bearing 53 is subjected only to a radial load from the transmission shaft 31 without undergoing the force Fs. The third bearing 53 is a rolling bearing such as a deep groove ball bearing. The third bearing 53 includes an inner ring having its upper end surface abutting on a bottom surface of the worm 33. The second shaft portion 36 is rotatably supported by the third bearing 53. The first bearing 51 will be described later. Reference numeral 64 designates an oil seal.

The transmission case 40 has an opening 43 formed in a bottom end surface 44 thereof positioned opposite from the clutch 20. When assembled together within the case 40, the transmission shaft 31, the worm 33, the wheel 34, the second bearing 52, the third bearing 53, and the oil seal 64 are inserted through the opening 43 into the case 40. The opening 43 is closed by a lid 60. The lid 60 serves to prevent the worm 33 from coming out of the case 40.

The lid 60 may be less rigid because it is not subjected to the force Fs. The lid 60 is made by subjecting a steel sheet to press working. The lid 60 includes a flange 62 attached via a bolt 61 to a periphery of the bottom end surface 44 surrounding the opening 43. The flange 62 supports a lower end surface of an outer ring of the third bearing 53. This eliminates the need to provide the case 40 with an additional retaining ring for retaining the third ring 53 within the case 40.

The thrusting reaction force Fs applied from the worm 33 to the transmission shaft 31 is directed towards the clutch 20 (upwardly). Hence, the third bearing 53 does not undergo the force Fs. Therefore, the flange 62 need not support the entire area of the lower end surface of the outer ring of the third bearing 53. In other words, the flange 62 needs to support only one part of the lower end surface of the outer ring of the third bearing 53.

Provision of the lid 60 makes it possible to prevent the transmission shaft 31, the worm 33, and the third bearing 53 from coming out of the transmission case 40. This eliminates the need for a separate component for preventing the transmission shaft 31, the worm 33, and the third bearing 53 from coming out of the transmission case 40. This results in the reduced number of components of the tiller 10. Further, it becomes possible to assemble the tiller 10 with increased efficiency. Furthermore, it becomes possible to reduce the number of steps necessary to assemble the tiller 10.

The lid 60 is subjected to press working to provide the flange 62. The thus simply constructed lid 60 serves to prevent the third bearing 53 from coming out of the transmission case 40.

Figure 4:
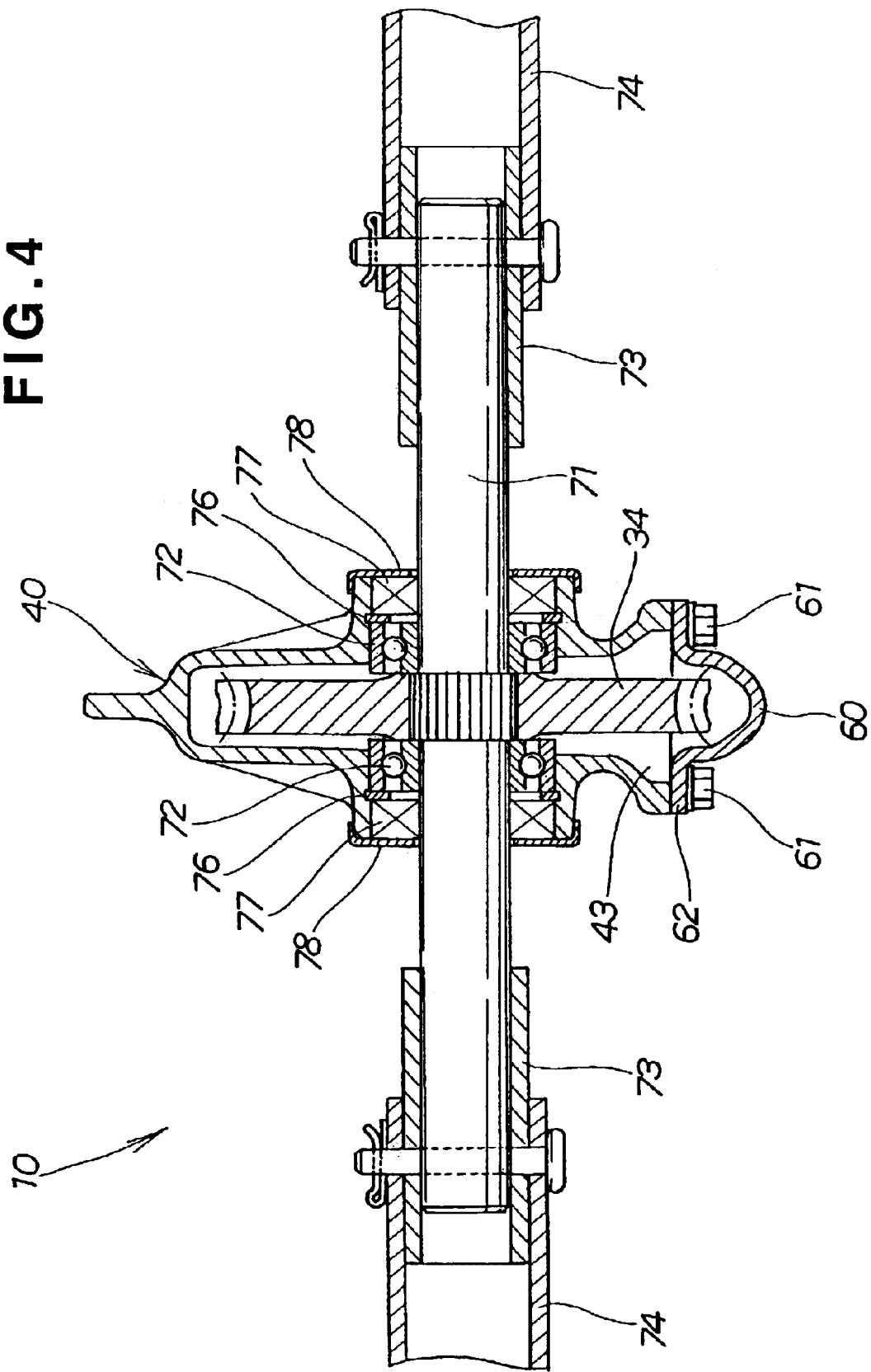
FIG. 4 is a cross-sectional view taken along line 4—4 of FIG. 3.

Referring to FIG. 4, the rotor shaft 71 coupled to the wheel 34 is rotatably supported by right and left rolling bearings 72, 72 within the case 40. The shaft 71 extending rightwardly and leftwardly from the case 40 has its right and left ends firmly fitted into the right and left hollow shafts 73, 74, 73, 74, respectively.

Reference numerals 76, 77, 78 denote a retaining ring, an oil seal, and a cap.

Figure 5:
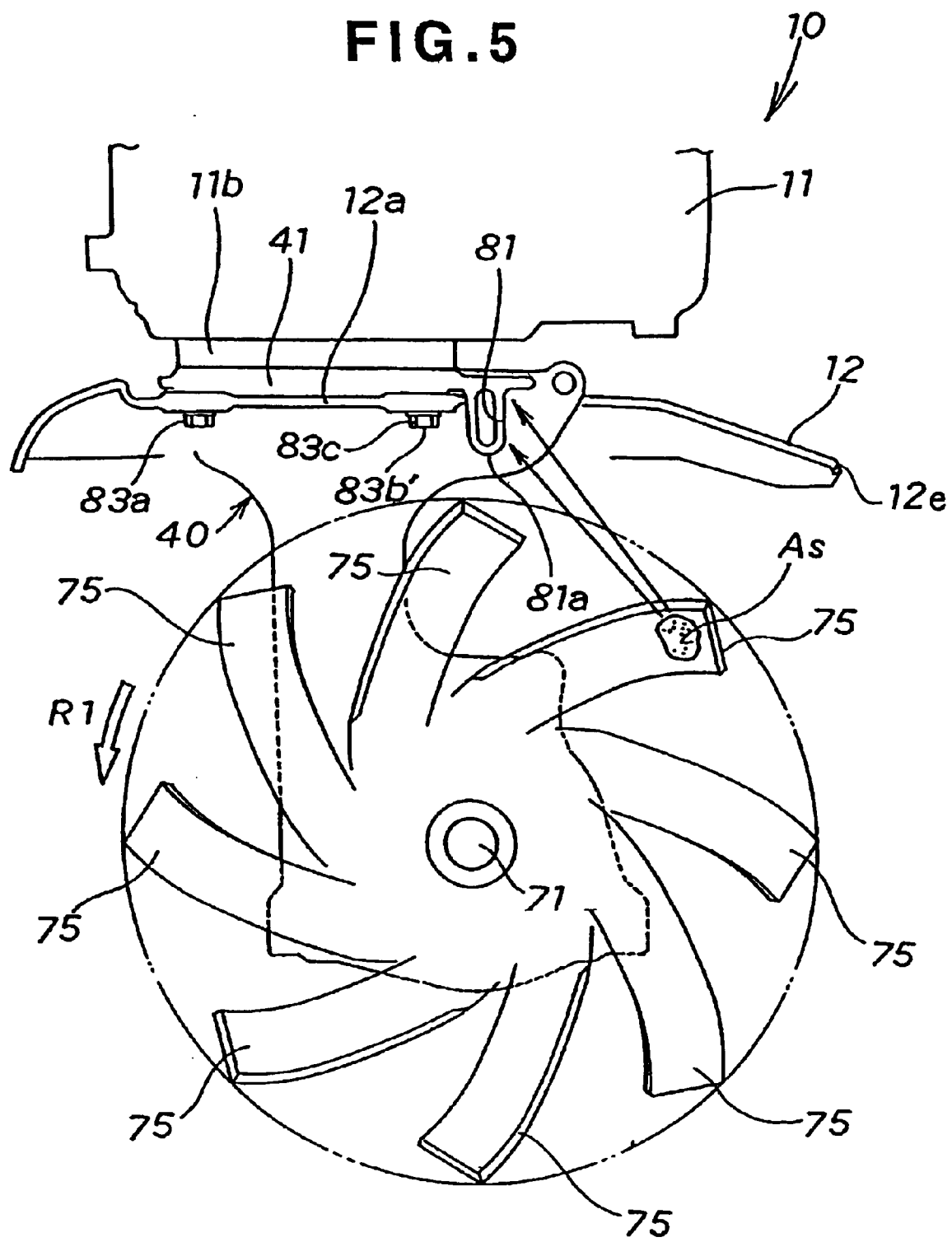
FIG. 5 is a view showing how an engine, the transmission case, and a fender are protected from foreign matters in accordance with the present invention.

Turning to FIG. 5, the transmission case 40 has a guard member 81 extending downwardly from a rear portion of an upper part thereof.

Figure 6:
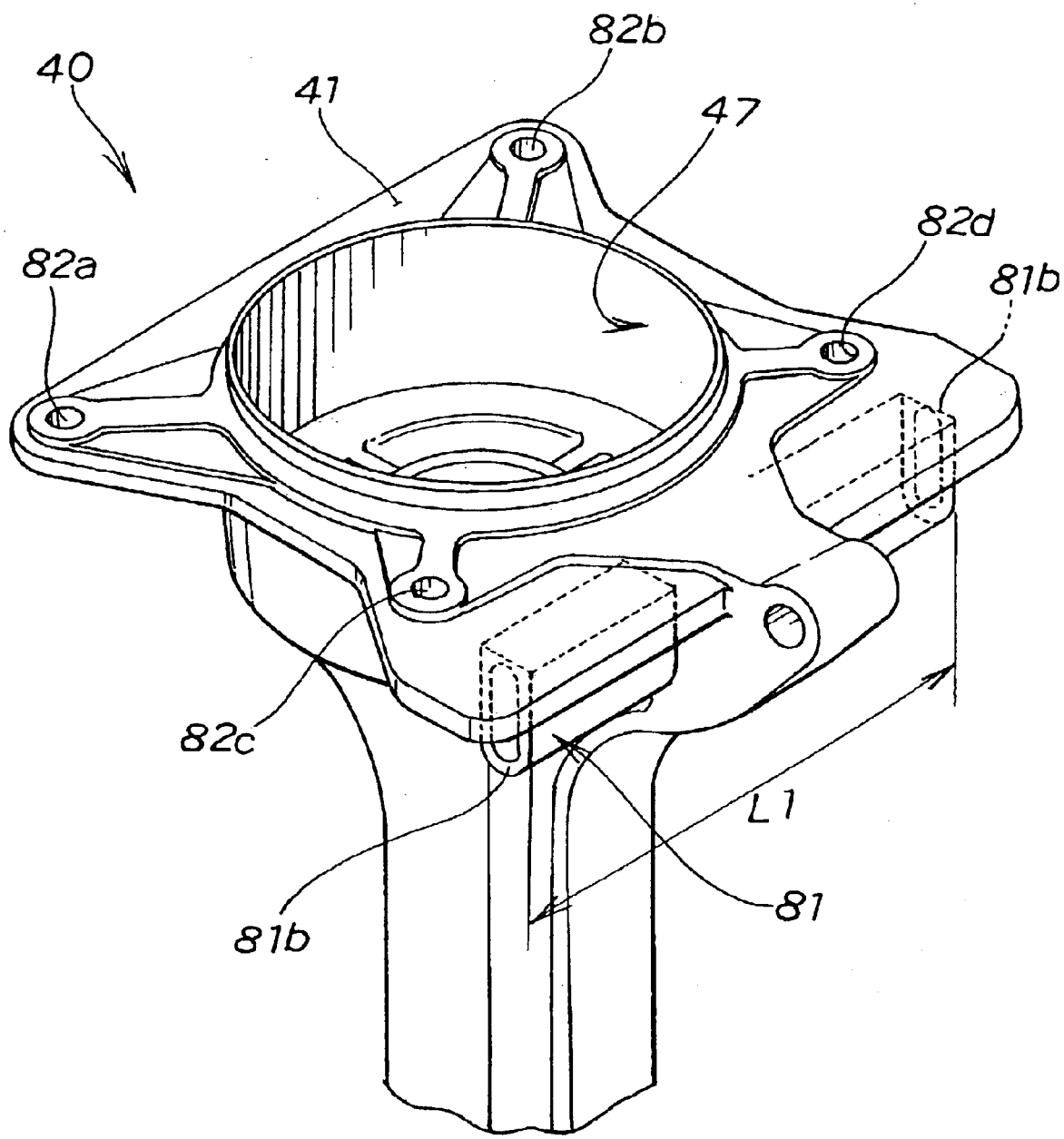
FIG. 6 is a perspective view of an upper part of the transmission case.

Reference is made to FIG. 6. The transmission case 40 includes an upper flange 41 provided at a top end thereof. The upper flange 41 has a horizontal sheet providing a generally rectangular shape as viewed in plan. The upper flange 41 has four bolt apertures 82a, 82b, 82c, 82d formed at four corners (two front corners at the front side of the flange 41 and two rear corners at the rear side of the flange 41, or two right corner and two left corners) thereof. Behind the bolt apertures 82c, 82d located at a rear part of the upper flange 41, the guard member 81 is positioned adjacent these two rear apertures 82c, 82d. The guard member 81 is integral with the rear part of the upper flange 41. The upper flange 41 is made by casting, together with the guard member 81. Because the upper flange 41 and the guard member 81 are integral with each other, the tiller 40 has the reduced number of components. A clutch housing portion 47 is provided for housing therein the clutch 20.

Figure 7:
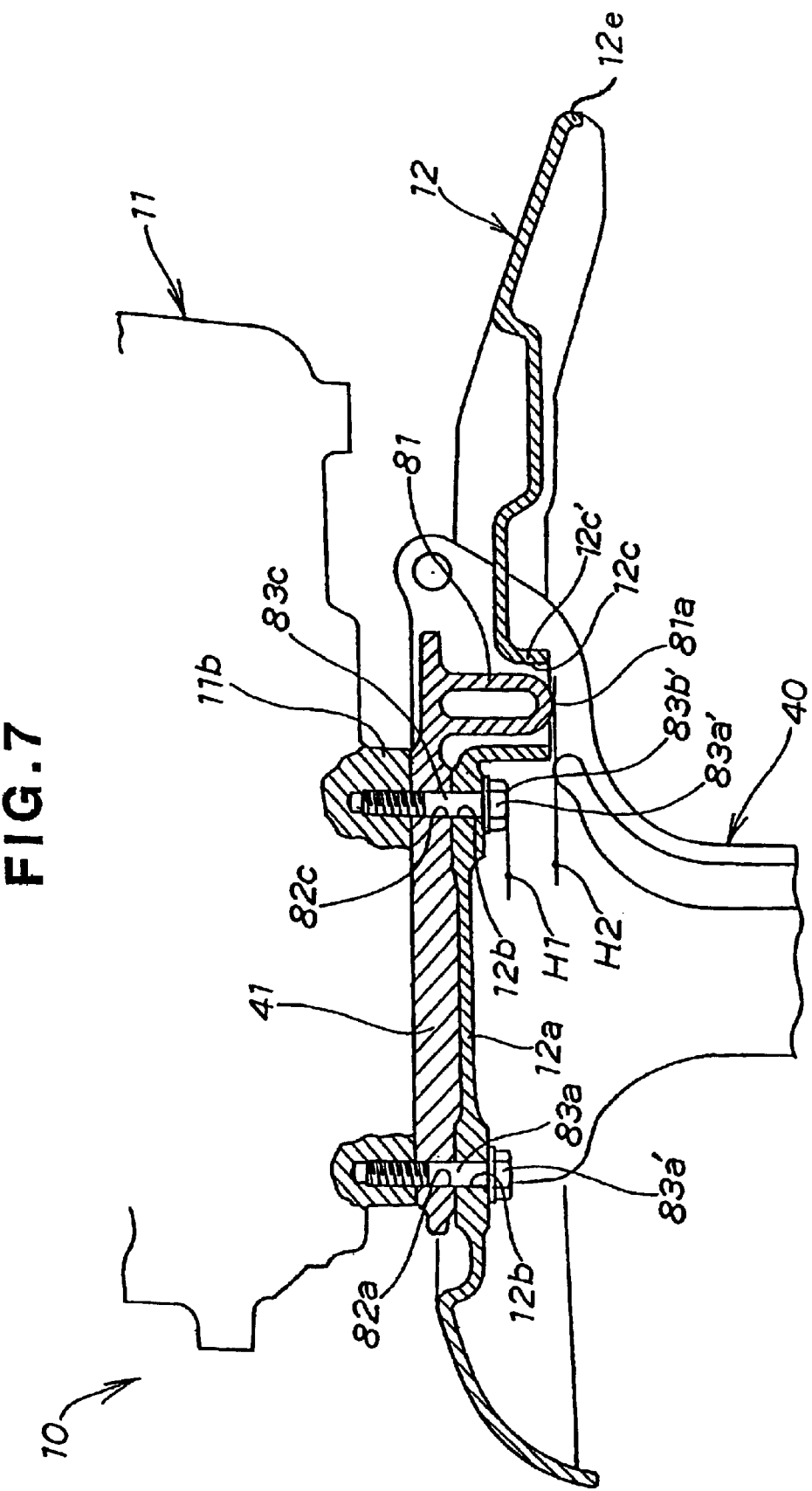
FIG. 7 is an enlarged view of FIG. 5 showing in cross-section an upper flange of the transmission case and the fender attached to the engine.

Referring to FIG. 7, the engine 11 has a lower flange 11b extending horizontally. The lower flange 11b has the upper flange 41 lying under a lower surface thereof. The fender 12 has a horizontal flange 12a formed at an upper surface thereof. The flange 12a lies under the upper flange 41. The lower flange 11b, the upper flange 41 and the flange 12a are positioned one on the other. The flange 12a has four bolt apertures 12b each formed to extend therethrough. The upper flange 41 has the bolt apertures 82a to 82d formed extend therethrough. The respective apertures 12b are aligned with the respective apertures 82a to 82d. Plural bolts 83a to 83d for attaching the fender 12 to the engine 11 are inserted from below the flange 12a through the apertures 12b, 82a through 82d to thereby fasten the lower flange 11b, the upper flange 41, and the flange 12a together. This allows the transmission case 40 and the fender 12 to be mounted to the engine 11. The fender 12 can thus be mounted to the upper part of the transmission case 40.

The guard member 81 extends downwardly through the fender 12 from behind the bolts 83c, 83d positioned at the rear part of the upper flange 41. Each of the bolts 83a to 83d is a hexagonal head bolt having a portion (i.e., a head 83a' in the illustrated embodiment) projecting downwardly from the fender 12.

The guard member 81 is a vertically elongated member extending downwardly from the transmission case 40 to a level H2 lower than a level H1 at which a bottom end 83b' of the head 83a' of the bolt 83c is located. Accordingly, the guard member 81 has its lower end 81a positioned at the level H2 lower than the level H1 of the bottom end 83b'. The fender 12 has a portion 12c' projecting or extending downwardly therefrom to the level H2. The portion 12c' is integral with the fender 12. The portion 12c' has an aperture 12c formed therein. The guard member 81 extends through the aperture 12c. The portion 12c' can serve as a guard member. It will be appreciated that the other three bolts 83a, 83b, 83d are arranged in the same manner as the bolt 83c.

Figure 8:
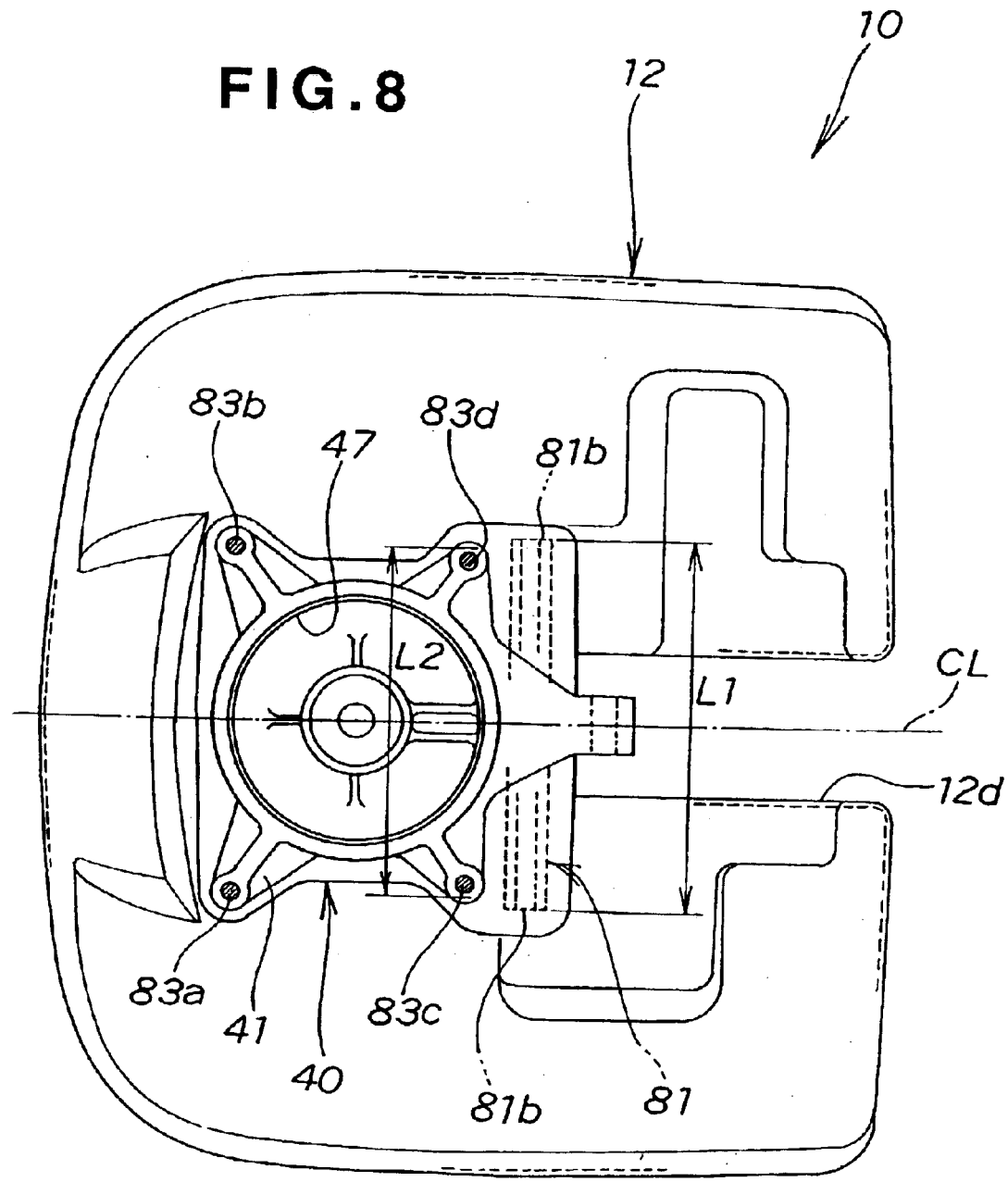
FIG. 8 is a plan view of the transmission case and the fender of the tiller.

With respect to FIG. 8, the fender 12 is positioned under the upper flange 41 of the transmission case 40.

The upper flange 41 has the right and left bolts front 83a, 83b positioned at a front side thereof, and the right and left rear bolts 83c, 83d positioned at the rear side thereof. The two bolts 83b, 83d are in symmetric relation to the two bolts 83a, 83c with a widthwise center CL provided midway therebetween.

A length or distance L1 the guard member 81 extends in a widthwise direction of the tiller 10 is greater than a distance L2 by which the heads 83a', 83a' of the two bolts 83c, 83d positioned at the rear part of the upper flange 41 are spaced from each other in the widthwise direction. In other words, the guard member 81 extends in the widthwise direction with respect to the centerline CL a farther extent than that of the bolt heads 83a', i.e., L1>L2. Therefore, the guard member 81 extending in the widthwise direction has right and left end surfaces 81b, 81b positioned rightwardly and leftwardly of the heads of the two bolts 83c, 83d, respectively. As shown in FIGS. 5 and 7, the guard member 81 extends widthwise of the tiller 10 between the rear bolts 83c, 83d and a rear outer peripheral edge 12e of the fender 12. Designated by reference numeral 12d is a recess out of which the operational rod 14 extends upwardly and rearwardly.

Discussion will be made as to how the guard member 81 is operated, in relation to FIG. 5.

As discussed above, the tillage tine 75 is turned only in the direction R1 (counterclockwise) such that, when tilling the ground, it is turned from the upward directed position through the forward directed position to the downward directed position.

There exist foreign matters such as small stones in soil to be tilled. When tilling the soil, the tillage tines 75 are turned in the direction R1 to thereby throw these foreign matters upwardly and rearwardly. The fender 12 blocks a path along which the foreign matters thus thrown up by the tines 75 would be otherwise flown or directed further upwardly.

The foreign matters thrown up by the tillage tines 75 include an object As to be directed or flown towards, particularly, the bolts 83c, 83d. If such an object As hits the bolts 83c, 83d or gets caught between the bolts 83c, 83d and the tines 75, these bolts are not rendered durable.

These bolts are to be attached to or detached from the fender 12, the flange 41, and the engine 11 when the tiller 10 is subjected to the maintenance operation. These bolts need to provide durability sufficient to achieve easy and appropriate maintenance operation on the tiller 10.

Of the bolts 83a through 83d, the bolts 83c, 83d positioned at the rear part of the upper flange 41 are highly likely to undergo impact by the object As or cooperate with the tines 75 to lodge the object As therebetween. The guard member 81 is provided behind and adjacent these bolts 83c, 83d. The guard member 81 extends downwardly to the level H2 (see FIG. 7) positioned lower than the bottom end 83b projecting downwardly from the fender 12.

The guard member 81 guards the bolts 83c, 83d against the foreign object As which would be otherwise directed or flown onto the bolts 83c, 83d after having been thrown up by the tine 75 under the tilling operation. Provision of the guard member 81 makes it possible to prevent the upwardly thrown object As from hitting the bolts 83c, 83d, particularly, the heads 83a', 83a'.

When some tillage tine 75 is turned to a position where its distal end is the closest to the lower end 81a of the guard member 81, the distal end and the lower end 81a provide a minimum gap therebetween. Such a gap is smaller than any gap between the distal end and any other neighboring part (e.g., the bottom end 83b, a lower surface of the fender 12 and the like). Thus, the upwardly thrown object As can get caught between the tine 75 and the lower end 81a rather than between the tine 75 and another part such as the bottom end 83b' of the bolt 83b. The guard member 81 is formed integrally with the transmission case 40 and provides increased rigidity sufficient to withstand impact by the object As.

It therefore becomes possible to prevent the object As from getting caught between the bolts 83c, 83d and the tines 75, 75, between the engine 11 and the tines, between the fender 12 and the tines, and between the upper flange 41 of the transmission case 40 and the tines.

Even if each of the bolts 83a to 83d is cheap, it can be reliably kept durable without requiring additional components. It thus becomes possible to ensure that the tiller 10 is properly subjected to the maintenance operation. The engine 11, the fender 12, and the upper flange 41 of the transmission case 40 as well as the bolts 83a to 83d can be kept sufficiently durable.

It will be understood that the guard member 81 offers the same advantage if designed to extend downwardly from the fender 12 rather than from the transmission case 40.

The present disclosure relates to the subject matter of Japanese Patent Application No. 2002-046222, filed Feb. 22, 2002, the disclosure of which is expressly incorporated herein by reference in its entirety.

What is claimed is:

1. A tiller comprising:

an engine for producing a motive power;

a transmission case mounted to the engine and having a transmission mechanism housed therein;

a rotor shaft rotatably mounted on the transmission case and connected to the transmission mechanism so that the rotor shaft can be driven by the motive power transmitted from the engine via the transmission mechanism;

tillage tines mounted on the rotor shaft to undergo rotation in one direction to perform a tilling operation while propelling the tiller in a forward direction;

a fender disposed above the tillage tines to cover the tillage tines;

a plurality of bolts connecting the fender to the transmission case, the bolts each having a portion projecting downwardly from the fender; and a guard member located on an upstream side of the projecting portions of the bolts when viewed in the direction of rotation of the tillage tines and extending downwardly from at least one of the transmission case and the fender to a level lower than the projecting portion of each of the bolts so as to guard the projecting portions against a foreign object thrown upwardly by the tillage tines during the tilling operation, the guard member extending in a widthwise direction with respect to a longitudinal centerline of the tiller a farther extent than that of the projecting portions of the bolts in the widthwise direction.

2. A tiller according to claim 1; wherein the transmission case has an upper flange attached by the bolts to a lower part of the engine with the fender attached by the bolts to an underside of the upper flange, the upper flange has a front end and a rear end, the guard member is integral with the upper flange and disposed adjacent to the rear end of the upper flange, and the fender has an aperture through which the guard member extends downwardly.

3. A tiller according to claim 2; wherein the fender has a portion projecting downwardly to the level of the projecting portion of each bolt, and the aperture is formed in the projecting portion of the fender.

4. A tiller according to claim 1; wherein the transmission mechanism comprises a transmission shaft connected to be rotationally driven by the motive power produced by the engine, and a worm gear mechanism for transmitting rotation of the transmission shaft to the rotor shaft to rotationally drive the rotor shaft.

5. A tiller according to claim 4; wherein the worm gear mechanism comprises a worm gear rotationally driven by the transmission shaft, and a worm wheel splined to the rotor shaft and engaged with the worm gear to transmit rotation of the worm gear to the rotor shaft.

6. A tiller according to claim 4; further including a clutch connected between the engine and the transmission mechanism.

7. A tiller according to claim 4; wherein the transmission case has an upper flange attached by the bolts to a lower part of the engine with the fender attached by the bolts to an underside of the upper flange, the upper flange has a front end and a rear end, the guard member is integral with the upper flange and disposed adjacent to the rear end of the upper flange, and the fender has an aperture through which the guard member extends downwardly.

8. A tiller according to claim 7; wherein the fender has a portion projecting downwardly to the level of the projecting portion of each bolt, and the aperture is formed in the projecting portion of the fender.

9. A tiller comprising: an engine; a transmission case mounted to the engine and housing therein a transmission mechanism connected to be rotationally driven by the engine; a rotor shaft rotatably mounted on the transmission case and connected to be rotationally driven in a forward direction of rotation by the transmission mechanism; tillage tines mounted on the rotor shaft to undergo rotation therewith in the forward direction to perform a tilling operation during use of the tiller while propelling the tiller in a forward direction; a fender disposed above the tillage tines and having an outer peripheral edge extending around the outer periphery thereof; plural bolts removably connecting the fender to the transmission case, the plural bolts including front bolts disposed at a front side of the fender and rear bolts disposed at a rear side of the fender, and the front and rear bolts each having a projecting portion projecting downwardly from an underside of the fender and facing the tillage tines; and a guard member extending widthwise of the tiller and disposed between the rear bolts and a rear outer peripheral edge of the fender at a location ahead of the rear bolts with respect to the forward direction of rotation of the tillage tines, the guard member extending downwardly a sufficient distance below the level of the rear bolt projecting portions to prevent the rear bolt projecting portions from being struck by objects thrown upwardly by the tillage tines during use of the tiller.

10. A tiller according to claim 9; wherein the guard member extends widthwise of the tiller in close proximity to the rear bolts.

11. A tiller according to claim 10; wherein the guard member extends downwardly from at least one of the transmission case and the fender.

12. A tiller according to claim 9; wherein the projecting portions of the bolts comprise bolt heads.

13. A tiller according to claim 9; wherein the transmission case has an upper flange attached by the bolts to a lower part of the engine with the fender attached by the bolts to an underside of the upper flange, the upper flange has a front end and a rear end, the guard member is integral with the upper flange and disposed adjacent to the rear end of the upper flange, and the fender has an aperture through which the guard member extends downwardly.

14. A tiller according to claim 13; wherein the fender has a portion projecting downwardly to the level of the projecting portion of each bolt, and the aperture is formed in the projecting portion of the fender.

15. A tiller according to claim 13; wherein the transmission mechanism comprises a transmission shaft connected to be rotationally driven by the engine, and a worm gear mechanism for transmitting rotation of the transmission shaft to the rotor shaft to rotationally drive the rotor shaft.

16. A tiller according to claim 15; wherein the worm gear mechanism comprises a worm gear rotationally driven by the transmission shaft, and a worm wheel splined to the rotor shaft and engaged with the worm gear to transmit rotation of the worm gear to the rotor shaft.

17. A tiller according to claim 9; wherein the transmission mechanism comprises a transmission shaft connected to be rotationally driven by the engine, and a worm gear mechanism for transmitting rotation of the transmission shaft to the rotor shaft to rotationally drive the rotor shaft.

18. A tiller according to claim 17; wherein the worm gear mechanism comprises a worm gear rotationally driven by the transmission shaft, and a worm wheel splined to the rotor shaft and engaged with the worm gear to transmit rotation of the worm gear to the rotor shaft.

19. A tiller according to claim 18; further including a clutch connected between the engine and the transmission mechanism.

* * * * *